US011314728B1

(12) United States Patent
Riley et al.

(10) Patent No.: US 11,314,728 B1
(45) Date of Patent: Apr. 26, 2022

(54) RANGE DELETES ON A DISTRIBUTED DATABASE

(71) Applicant: Amazon Technologies, Inc., Seattle, WA (US)

(72) Inventors: Nathan Pellegrom Riley, Seattle, WA (US); Derek William Richard Chen-Becker, Centennial, CO (US); Akshat Vig, Seattle, WA (US); Almero Gouws, Seattle, WA (US); Lewis Bruck, Bothell, WA (US); Vaibhav Jain, Seattle, WA (US); James Christopher Sorenson, III, Seattle, WA (US); Somasundaram Perianayagam, Seattle, WA (US); Rishabh Jain, Seattle, WA (US); Douglas Brian Terry, San Carlos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1 day.

(21) Appl. No.: 16/694,948

(22) Filed: Nov. 25, 2019

(51) Int. Cl.
*G06F 16/23* (2019.01)
*G06F 16/2455* (2019.01)
*G06F 16/27* (2019.01)
*G06F 16/22* (2019.01)

(52) U.S. Cl.
CPC ...... *G06F 16/2379* (2019.01); *G06F 16/2282* (2019.01); *G06F 16/24565* (2019.01); *G06F 16/27* (2019.01)

(58) Field of Classification Search
None
See application file for complete search history.

(56) References Cited

U.S. PATENT DOCUMENTS

| 2018/0129666 A1* | 5/2018 | Havewala | G06F 3/0644 |
| 2018/0150230 A1* | 5/2018 | Schreter | G06F 11/16 |
| 2020/0097558 A1* | 3/2020 | Fanghaenel | G06F 16/2246 |

* cited by examiner

*Primary Examiner* — Richard L Bowen
(74) *Attorney, Agent, or Firm* — Davis Wright Tremaine LLP

(57) ABSTRACT

A distributed database system maintains data for a logical table by storing, on a plurality of storage nodes, a collection of key-item pairs. An operation to delete a range of these items is processed by first storing, on each of the plurality of storage nodes, a tombstone record indicative of the items to be deleted. The tombstones are committed once each of the plurality of nodes has stored the tombstone. Items within the range are treated as deleted. A cleanup operation deletes items within the range and updates the tombstone.

20 Claims, 9 Drawing Sheets

RANGE DELETES ON A DISTRIBUTED DATABASE

BACKGROUND

Distributed database systems may be called upon to provide scalable and reliable access to data. In some distributed database systems, data is maintained on a number of servers. Each may operate as an independent entity that maintains some portion of a collection of data. A distributed database system employing this approach may provide increased scalability and reliability compared to some other database systems. However, further improvements to such systems may be made. One example includes improving support for transactions in which a number of servers are involved.

BRIEF DESCRIPTION OF THE DRAWINGS

Various techniques will be described with reference to the drawings, in which.

DETAILED DESCRIPTION

In an example of a distributed database system, an operation is performed to delete a range of data items that are stored across a plurality of the system's storage nodes. The range delete operation is performed in an atomic transaction, so that either all of the items included in the range are deleted, or none are. To perform the delete operation atomically, the distributed database system prepares tombstone records on each of the system's storage nodes. The tombstone records indicate a range of records to be deleted. Once each node has prepared a tombstone record, the delete operation is committed. When processing a query, the system determines whether or not an item should be included in the results of the query, based on whether or not the item falls within a range indicated by the tombstone. If the item is included in the range, it is omitted from the query results as if it had been deleted. A cleanup process is run over time to delete the items in the range indicated by the tombstone, and the range is adjusted so that already deleted items are excluded from the tombstone. When all of the items in a tombstone have been deleted, the tombstone itself may also be deleted.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including those related to the storage and retrieval of configuration information. In particular, the technical field of computing configuration management is improved by the provision of techniques, embodiments of which are described herein, for indexing configuration data and facilitating the efficient retrieval of configuration data.

Figure 1:
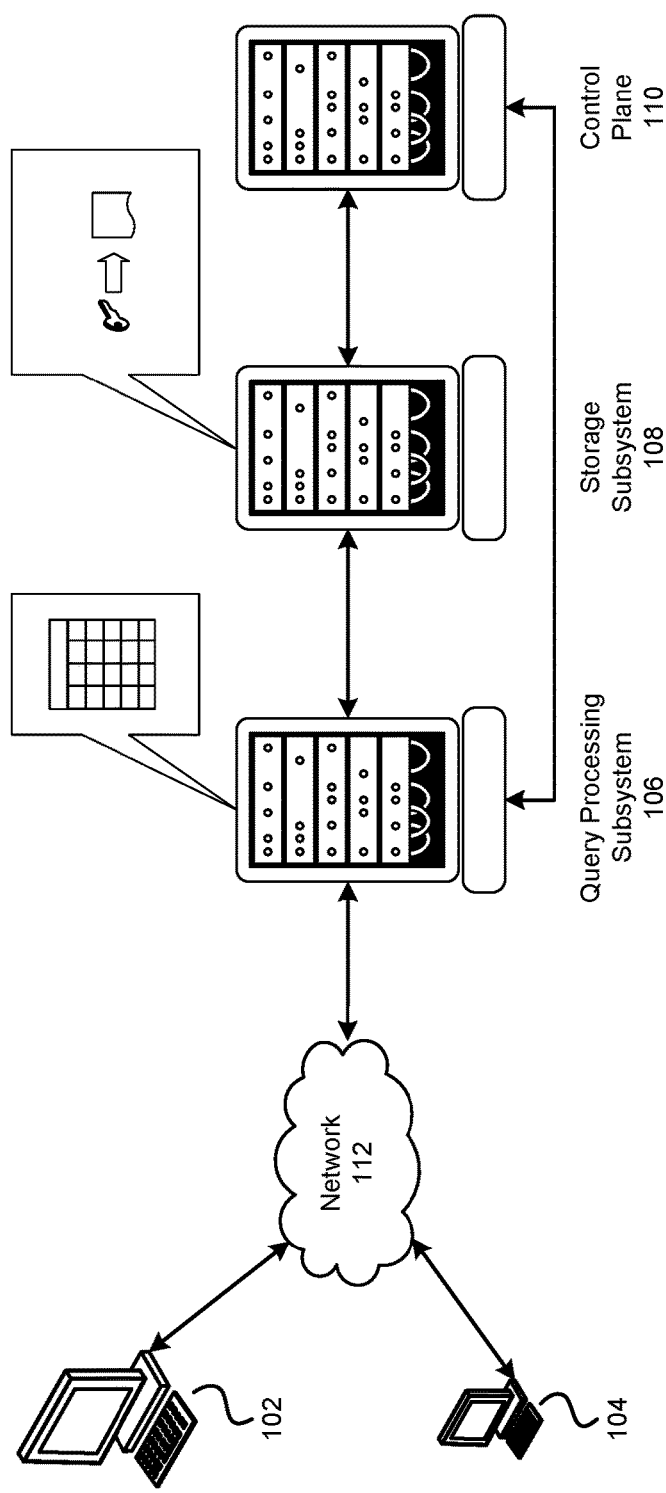
FIG. 1 illustrates an example distributed database system, in accordance with at least one embodiment.

FIG. 1 illustrates an example distributed database system, in accordance with at least one embodiment. In the example of FIG. 1, a distributed database system 100 is a multi-tenant database system, capable of storing data on behalf of a plurality of clients 102, 104. The distributed database system 100 may be described as multi-tenant because data maintained by the system 100 on behalf of one client 102 is not generally visible to another client 104.

In the example of FIG. 1, the distributed database system 100 comprises a query processing subsystem 106, storage subsystem 108, and control plane 110.

A client 102, 104 may comprise a computing device, computing process, hosted computing service, and so forth. A client, as used herein, generally refers to a client device associated with a particular entity, such as a customer of a hosted distributed database service.

In at least one embodiment of the depicted system 100, interaction between a client 102, 104 and the distributed database system 100 is performed using an interaction protocol that defines a format for exchanging messages between a client 102, 104 and the distributed database system 100. A client 102, 104 may comprise a driver module, or other software, that implements an interaction protocol. Clients 102, 104 may communicate with the distributed database system 100 via a network 112, e.g. by transmitting messages via an interaction protocol to a front-end system, such as to a node or other element of a query processing subsystem 106.

In the example of FIG. 1, query processing subsystem 106 comprises a plurality of front-end nodes, which may also be described as front-end peers, query processing peers, or as peers. In at least one embodiment of the depicted system 100, front-end nodes are added to or removed from the front-end 106 to scale according to demands on capacity or utilization.

In at least one embodiment of the depicted system 100, query processing subsystem 106 provides table-oriented access to data maintained by the distributed database system 100. Table-oriented, or tabular, access refers, in part, to the data being accessed in terms of tables, e.g., as rows and columns of table.

In at least one embodiment of the depicted system 100, query processing subsystem 106 provides access to data specified in terms of a table-oriented query language, such as structured query language ("SQL") or Cassandra query language ("CQL"). In at least one embodiment of the depicted system 100, access to data is table-oriented but non-relational. As such, a query language supported by the query processing subsystem 106 may be a subset of a relational query language, such as SQL.

In at least one embodiment of the depicted system 100, query processing subsystem 106 comprises a query parser and query planner. When a query is received from a client 102, 104, the query parser analyzes the query, identifies the query's constituent keywords and clauses, and determines the query's meaning. The query planner then formulates a plan for executing the query. In at least one embodiment of the depicted system 100, the query processing subsystem 106 then executes the query plan.

In at least one embodiment of the depicted system 100, each node of the query processing subsystem 106 is independently capable of performing the aforementioned functions of the query parser and query planner, and of executing the generated query plan. In at least one embodiment of the depicted system 100, execution of a generated query plan comprises interaction with one or more storage nodes of a storage subsystem 108.

In the example of FIG. 1, storage subsystem 108 comprises a plurality of storage nodes, which may also be describe as storage peers, or as peers. The term peer may also be used to refer to a combination of one or more query processing peers and one or more storage peers.

In at least one embodiment of the depicted system 100, storage nodes are added to or removed from the storage subsystem 108 to scale according to demands on capacity or utilization.

In at least one embodiment of the depicted system 100, the storage subsystem 108 operates as a key-value, non-relational data store. The storage subsystem 108, in at least one embodiment of the depicted distributed database system 100, is a key-value or key-to-values data store having comparatively high scaling properties, but comparatively limited query capabilities. For example, while embodiments of the query processing subsystem 106 may provide support for SQL or CQL queries, embodiments of the storage subsystem may instead support comparatively primitive operations which store and retrieve individual values, or collections of values, based on a key value. The storage subsystem 108 may, in some embodiments, provide limited support for range queries, e.g. by providing for the retrieval of values, or collections of values, associated with a range of key values. In at least one embodiment of the depicted distributed database system 100, these limitations allow the system 100 to be highly scalable, and to facilitate implementation of a range of replication models and approaches to multi-tenancy.

In at least one embodiment of the depicted system 100, a control plane 110 facilitates scaling the capacity of the query processing subsystem 106. The control plane 110 may, for example, monitor actual or forecast capacity utilization of the query processing subsystem 106 and add or remove query processing nodes accordingly.

In at least one embodiment of the depicted system 100, a control plane 110 facilitates scaling the capacity of the storage subsystem 108. The control plane 110 may, for example, monitor actual or forecast capacity utilization of the storage subsystem 108 and add or remove storage nodes to the subsystem.

In at least one embodiment of the depicted system 100, the control plane 110 facilitates management of capacity utilization by respective clients 102, 104. For example, the control plane 110 may monitor capacity utilization by clients 102, 104 and determine allocations of partitions among storage nodes of the storage subsystem 108. Similarly, the control plane 110 may determine how many and which query processing nodes the clients 102, 104 should have access to.

Figure 2:
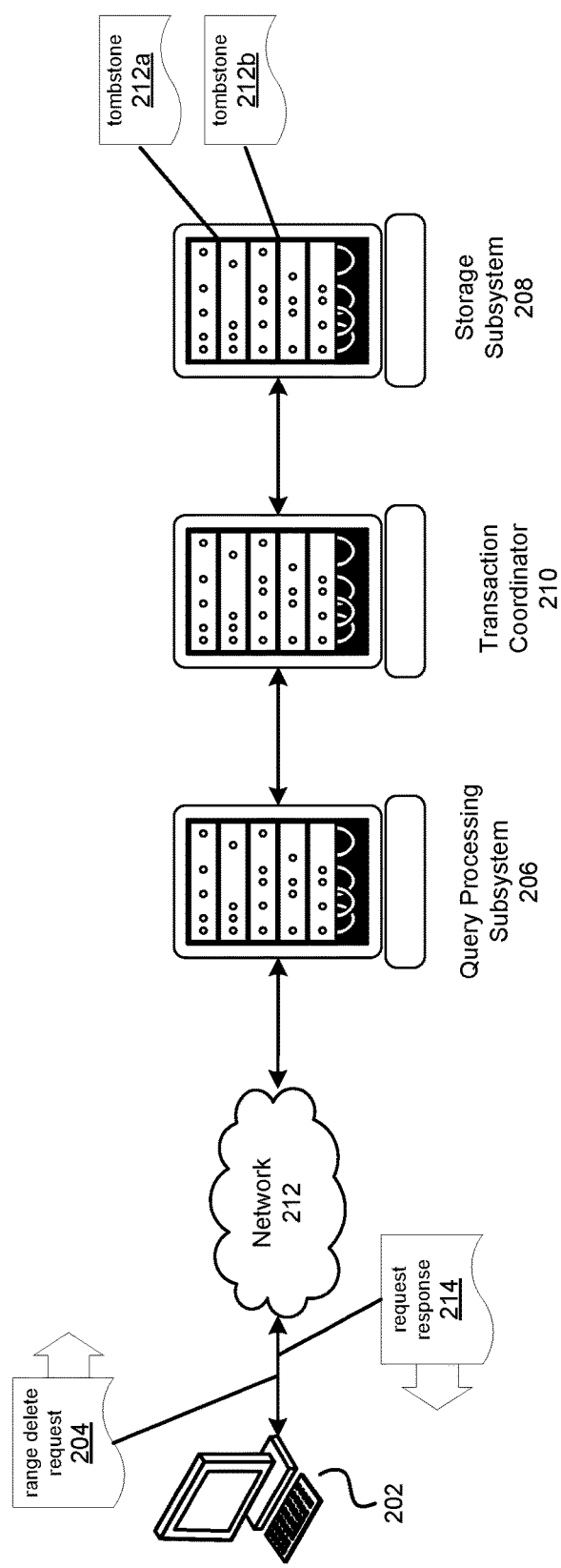
FIG. 2 illustrates an example of a distributed database system processing a range delete, in accordance with at least one embodiment.

FIG. 2 illustrates an example of a distributed database system processing a range delete, in accordance with at least one embodiment. The components of the example distributed database system 200 depicted in FIG. 2 may correspond to those of FIG. 1.

A range delete request, in at least one embodiment, comprises instructions to delete a plurality of rows from a logical table. In a further aspect, data for the rows of the logical table is stored in a collection of key-item pairs. For example, each row may correspond to a key-item pair in the collection. Accordingly, a range delete request, in at least one embodiment, is indicative of deleting a plurality of items from a collection of key-item pairs.

A range delete request may be more complex than deleting a single item, particularly in a distributed database system. In such systems, where the items to be deleted may be spread across a plurality of storage nodes, a technique described herein may employ a two-phase commit protocol to install tombstone records on each of the affected storage nodes. For example, as depicted in FIG. 2, a query processing subsystem 206 may receive a range delete request 204. The range delete request 204 may be sent by a client 202, via a network 212, to the query processing subsystem 206. The range delete request 204, in at least one embodiment, is a relational or table-oriented query, such as a query expressed in SQL or CQL. The range delete request 204, in at least one embodiment, is a request to delete a plurality of rows from a table.

In FIG. 2, the example distributed database system 200 is depicted processing a range delete request 204, and returning a response 214 to the range delete request 204.

In at least one embodiment, the query processing subsystem translates the command to a request to delete a plurality of items from a collection of key-item pairs maintained, collectively, by storage nodes of the storage subsystem 208. The storage subsystem 208 comprises a plurality of storage nodes, each of which maintains a portion of the collection of key-item pairs. These portions may sometimes be referred to as partitions.

As noted, the range delete request pertains to a plurality of items, rather than to a single item. These items may be stored on a number of storage nodes of the storage subsystem 208. As such, in at least one embodiment, each of these storage nodes is involved in processing the range delete.

In at least one embodiment, a transaction coordinator 210 causes a tombstone record, such as the tombstone records 212a,b depicted in FIG. 2, on each storage node that includes items to be deleted by the range delete. The tombstone records each include information indicating a range of items to be deleted in response to the range delete request 204. The tombstone records 212a,b are initially stored in an uncommitted state. When the transaction coordinator 210 determines that each of the involved storage nodes has stored a tombstone record, the transaction coordinator 210 commits the tombstone records. Once the tombstone records 210a,b are committed, the items are treated as if they had been deleted from the storage subsystem 208. A timestamp for the deletion, in at least one embodiment, is assigned at the time commitment occurs.

In at least one embodiment, a storage node of the storage subsystem 208 maintains its own tombstone record. For example, a first storage node might maintain its own version of a first tombstone record 212*a*, and a second storage node might maintain its own version of a second tombstone record 212*b*.

In at least one embodiment, a storage node of the storage subsystem 208 performs a task to delete items indicated in a tombstone record as deleted. Deleting an item, as opposed to merely indicating the item as deleted in the tombstone record, comprises operations such as freeing storage space for other purposes, making the item inaccessible by removing links to the item from other memory locations, deallocating memory used to store the item, and so forth. It will be appreciated that these examples are intended to be illustrative rather than limiting, and as such should not be construed in a manner which would limit the scope of the present disclosure to only those embodiments which include the specific examples provided.

A tombstone record maintained on a storage node, in at least one embodiment, is updated, as items are deleted from the storage node, to exclude deleted items from the range of indicated records. For example, a tombstone record might initially indicate that records 10-80 should be treated as deleted. Subsequently, records 10-30 might be actually deleted from the storage node. The tombstone record might then be updated to indicate that records 31-80 should be treated as deleted. This process can continue until all of records 10-80 have been actually deleted, at which time the tombstone record can be deleted from that storage node. Note, however, that other storage nodes might not be deleting items at the same rate, and as such might still possess their own versions of the tombstone record, even after other storage nodes have deleted their own versions. This approach for maintaining the tombstone records, involving each node maintaining its own version and adjusting the indicated range as the underlying items are actually deleted, may have a benefit of increasing data retrieval efficiency, since the overhead imposed by the presence of the tombstone record decreases over time as the range of items covered by the record is reduced.

In at least one embodiment, a storage node of the storage subsystem 208 treats items included in the tombstone record as if those items were not stored or found. For example, the storage node might respond to a GET request for an item by returning an empty record, returning a failure indication, and so forth.

In at least one embodiment, a storage node of the storage subsystem 208 processes requests to retrieve items by accessing the item while also (in serial or in parallel) accessing tombstone records to determine if the item is included in a range of tombstoned items. If the retrieved item is included in the range, it can be treated as if it had not been found or stored.

In at least one embodiment, a storage node of the storage subsystem 208 provides a requested item to the query processing system 206, and provides an indication of whether or not the item is included in the range of a tombstone. These operations, in at least one embodiment, are performed in parallel. The query processing system 206 then excludes the item from the results of a query it is processing. For example, the query processing system 206 might process a query of a logical table, and determine that one of the rows indicated by the query should, if it exists, be located on a particular storage node of the storage subsystem 208. The query processing subsystem 206 might then attempt to retrieve both the item and an indication of its tombstone status. If the item is tombstoned, the corresponding row is excluded from the results of the query of the logical table.

In at least one embodiment, tombstone records are maintained for each storage node, but are not stored on each storage node. For example, a central repository of tombstone information might be maintained.

Figure 3:
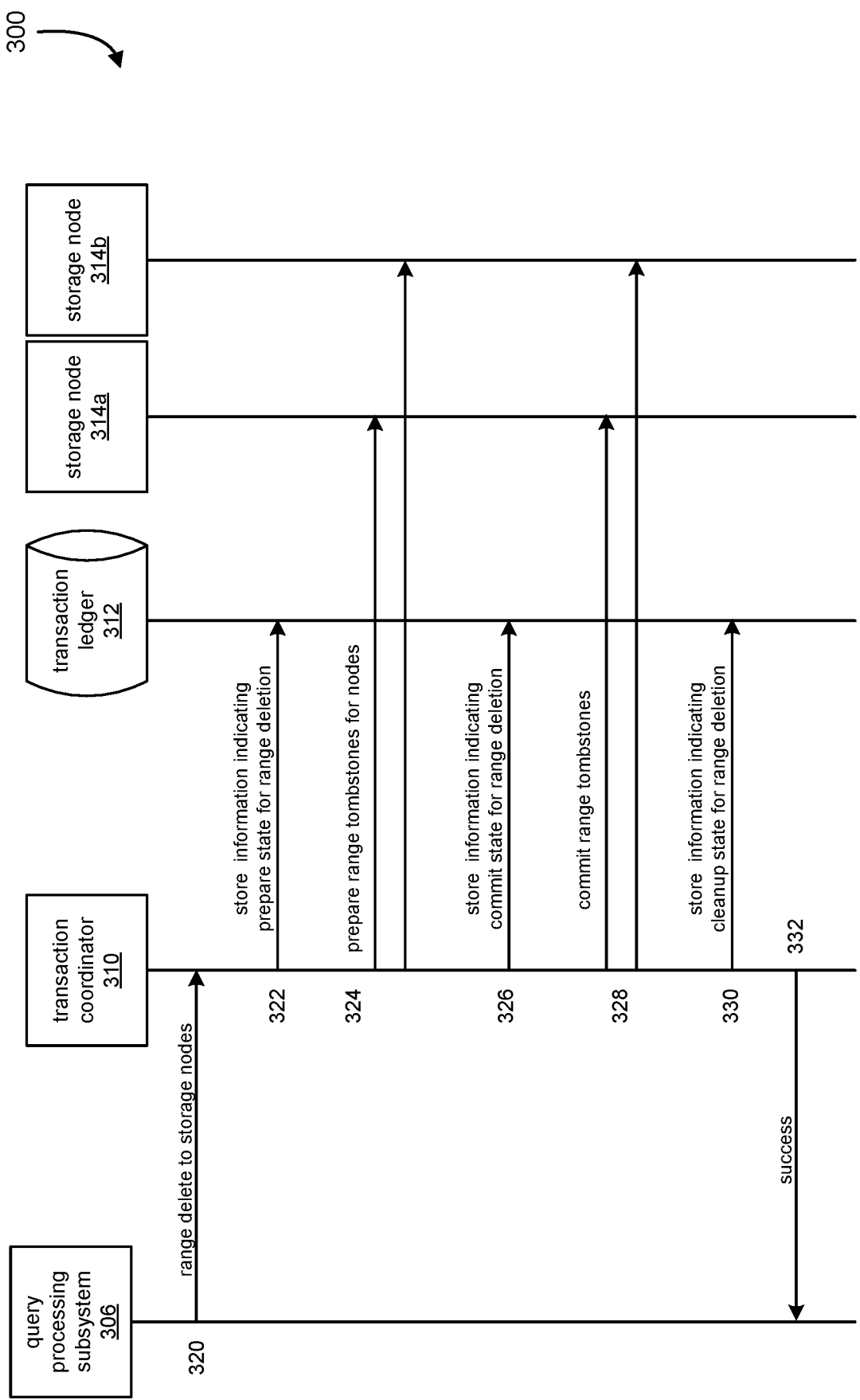
FIG. 3 illustrates further aspects of an example of a distributed database system processing a range delete, in accordance with at least one embodiment.

FIG. 3 illustrates further aspects of an example of a distributed database system processing a range delete, in accordance with at least one embodiment. In particular, FIG. 3 illustrates an example of interactions between components of a distributed database system, such as the distributed database systems depicted in FIGS. 1 and 2. These components may include a query processing subsystem 306, a transaction coordinator 310, a transaction ledger 312, and storage nodes 314*a,b* of a storage subsystem.

A query processing subsystem 306 may receive a command to delete rows from a logical table and identify corresponding items to be deleted from a key-item collection that maintains data for the logical table. An example of a delete command could be DELETE FROM t1 WHERE $c1>5$ and $c2<20$. This query indicates the deletion of any rows, from the logical table t1, whose values for the column c1 are greater than 5 and less than 20. Generally, such commands are to be executed as an atomic transaction, so that either all of the rows are successfully deleted or none of them are. The rows of the logical table will correspond, in some fashion, to a plurality of items.

In at least one embodiment, the query processing subsystem 306 then, at 320, sends range delete instructions to the transaction coordinator 310. The range delete instructions, which may be referred to as a command, can specify a range to delete as an atomic transaction. In some cases, the deleted items can include disjoint ranges or arbitrary sets.

In at least one embodiment, the transaction coordinator 310 then, at 322, stores, or causes to be stored, information indicating a prepare state for the range deletion operation. This information may be stored, in at least in embodiment, by a transaction ledger 312. The transaction ledger 312 may comprise a durable store of transaction information, such that it is unlikely to lose information in the event of a system failure.

In at least one embodiment, the transaction coordinator 310 then, at 324, causes range tombstone records to be prepared on each of the involved storage nodes 314*a,b*. For example, the transaction coordinator 310 may send instructions, to each of the involved storage nodes 314*a,b*, to prepare a tombstone record for the range deletion. The preparation comprises durably storing the tombstone record on the storage node, and may also comprise various additional steps, such as validating the range of items to be deleted. The tombstone record is initially stored in an uncommitted state. In at least one embodiment, items indicated in the range or ranges covered by a tombstone record are not treated as having been deleted while the record is uncommitted.

In at least one embodiment, the transaction coordinator 310 then, at 326, stores, or causes to be stored, information indicating a commit state for the range deletion operation. This occurs, in at least one embodiment, only when each involved storage node 314*a,b* has successfully prepared a tombstone record. This information may be stored on the transaction ledger 312.

In at least one embodiment, the transaction coordinator 310 then, at 328, causes the tombstones to be committed on each of the involved storage nodes 314*a,b*. In at least one embodiment, this comprises updating data associated with the tombstone records, such as a flag indicating commit status.

In at least one embodiment, the transaction coordinator 310 then, at 330, stores information indicating a cleanup state for the range deletion operation. This information may be stored on the transaction ledger 312.

In at least one embodiment, the transaction coordinator 310 then, at 332, sends, to the query processing subsystem 306, an indication that the range delete operation has succeeded. Note that at this stage, the underlying items have not necessarily been deleted from their respective storage nodes. However, the deletion is made durable by the transition of the tombstones to a commit state.

Figure 4:
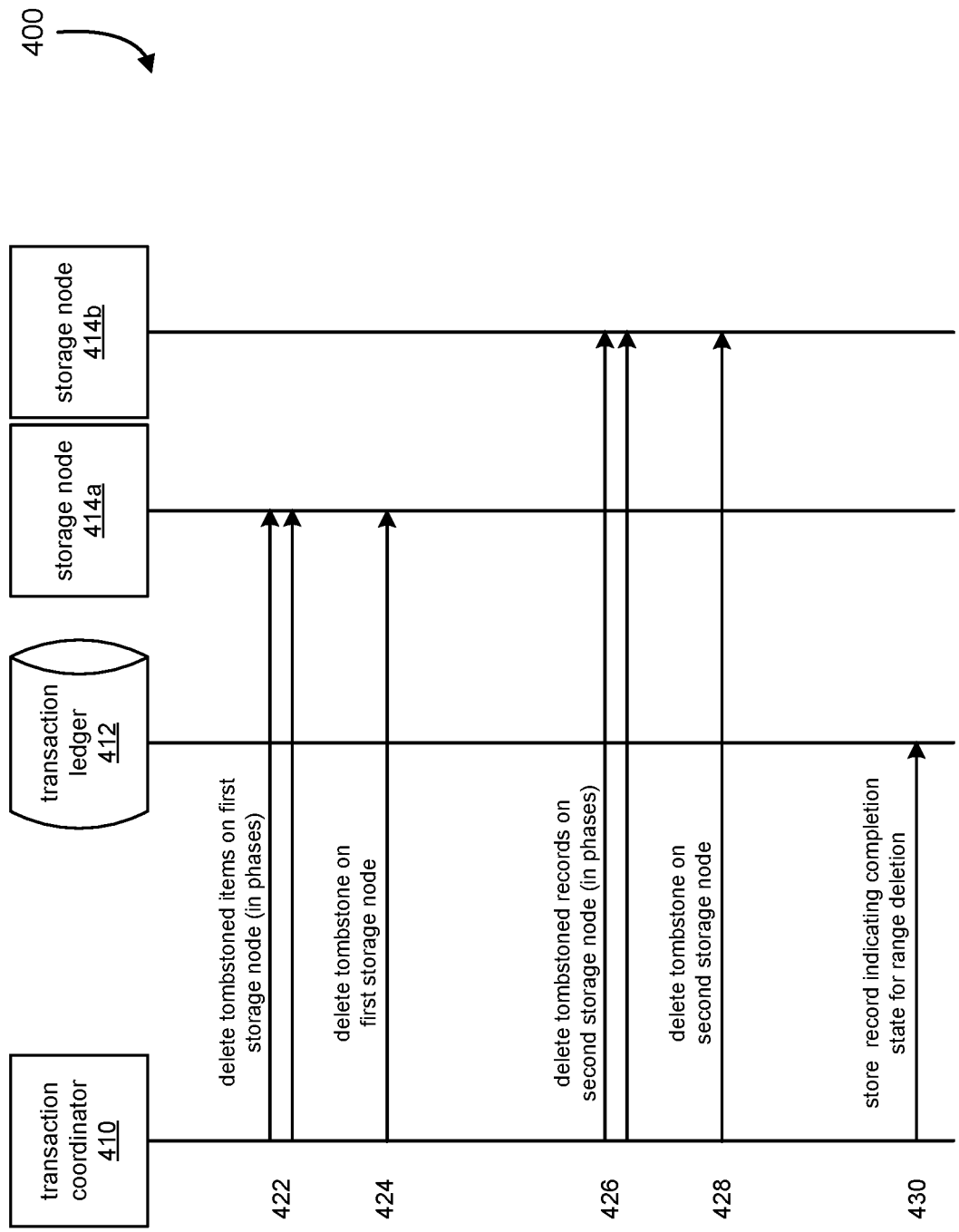
FIG. 4 illustrates an example of a distributed database system post-processing a range delete, in accordance with at least one embodiment.

FIG. 4 illustrates an example 400 of a distributed database system post-processing a range delete, in accordance with at least one embodiment. In particular, FIG. 4 illustrates an example of interactions between certain components of a distributed database system, such as the distributed database systems depicted in FIGS. 1 and 2, to deleting items that were logically deleted by the actions depicted in FIG. 3. The components involved in this process may include a transaction coordinator 410, a transaction leger 412, and storage nodes 414*a,b* of a storage subsystem.

After the tombstone records has been committed, the items within the range specified by a tombstone are logically deleted, and may then be actually deleted from the storage nodes. In at least one embodiment, a transaction coordinator facilitates this deletion by driving the storage nodes to delete tombstone items.

In at least one embodiment, at 422, the transaction coordinator 410, causes a storage node 414*a* to delete the tombstoned items that it has maintained. This may be a multi-phase operation, in which some portion of the tomb stoned items are deleted, and the tombstone updated, in each phase. Eventually, all items referenced by the tombstone may be deleted. Consequently, at 424, the transaction coordinator 410 causes the storage node 414*a* to delete the tombstone record.

At 426 and 428, a similar process occurs at a second storage node 414*b*. This process may be repeated for each node that stored data referenced by a tombstone.

In at least one embodiment, at 430, the transaction coordinator 410 stores a record indicating a completion state for the range deletion operation. This may be done once all of the tombstones associated with the operation have been deleted from each of the involved storage nodes 414*a,b*.

In at least one embodiment, the transaction coordinator uses its records of the range deletion operation to drive the storage nodes 414*a,b* to perform their respective cleanup operations. Once the storage nodes have physically deleted all of the items associated with the tombstones, and once all of the associated tombstone records have themselves been deleted, the transaction coordinator can cease driving the clean-up operation for the respective range delete operation. This technique, in at least one embodiment, may minimize overhead compared to techniques which involve continuous identification of tombstoned items.

As explained with respect to FIGS. 3 and 4, a tombstone record is stored on each storage node involved in a range delete operation. This may be further understood in view of FIG. 5, which illustrates an example of a tombstone record, in accordance with at least one embodiment.

Figure 5:
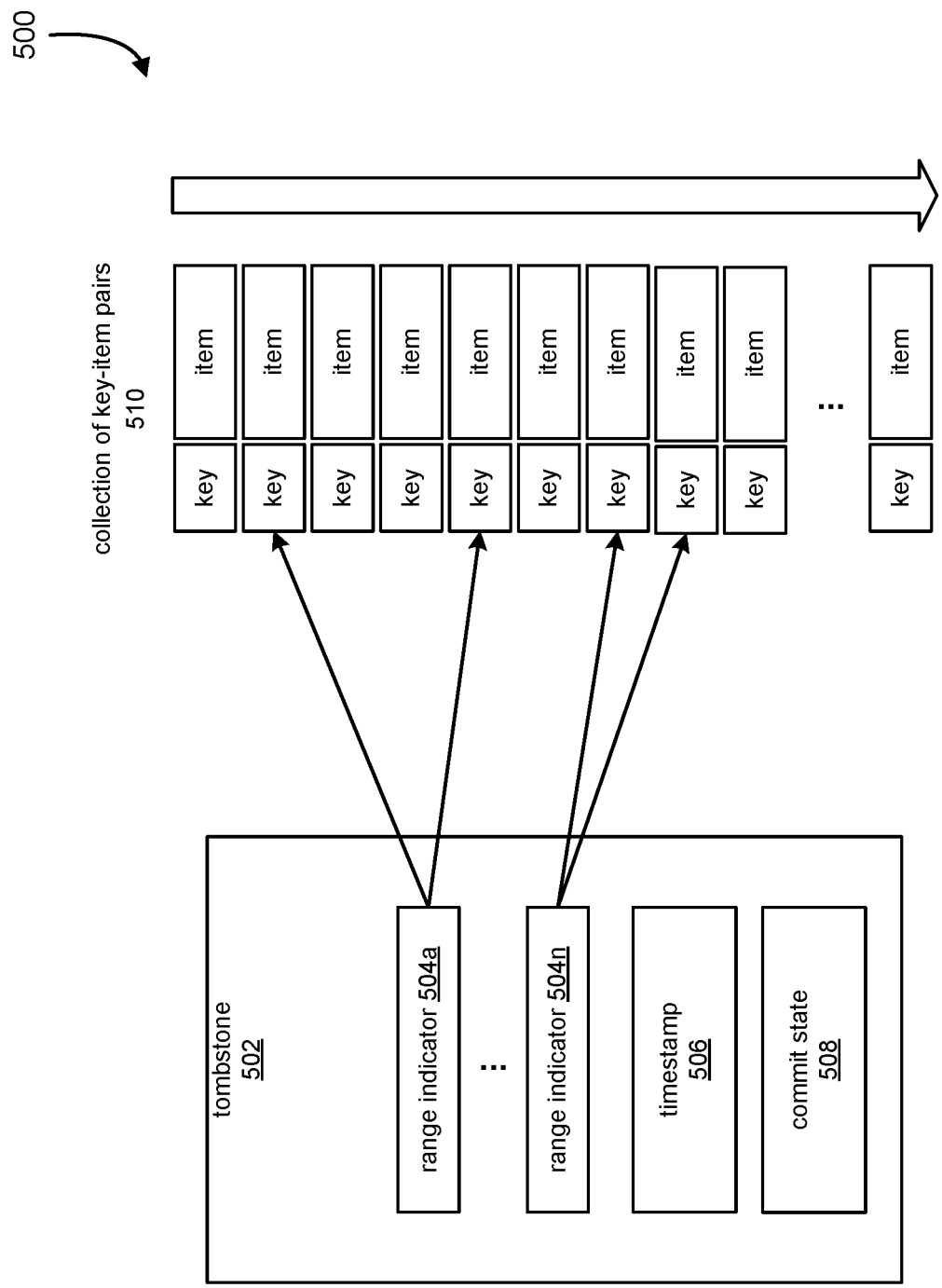
FIG. 5 illustrates an example of a tombstone record, in accordance with at least one embodiment.

As depicted in the example 500 of FIG. 5, a tombstone record 502 may comprise one or more range indicators 504*a* . . . n. Each of the range indicators 504*a* . . . n may represent a contiguous range of tombstoned items. Collectively, the range indicators 504*a* . . . n may represent a contiguous or discontiguous range of items stored in a collection of key-item pairs 510.

In at least one embodiment, ranges are indicated according to a minimum and maximum values for fields of a column of a logical table, or for a value of a property of an item.

In at least one embodiment, ranges are indicated by set representations. For example, a set of unique identifiers might be specified.

Over time, the range indicators 504*a* . . . n may be adjusted as items within the indicated ranges are deleted from storage.

The tombstone record 502, in at least one embodiment, comprises a timestamp 506. The timestamp 506 may indicate a time at which the range delete operation is deemed to have occurred. In at least one embodiment, the timestamp is set to the time at which the tombstone records are committed. In at least one embodiment, another time is used, such as the time at which the request to perform the range delete was received.

The tombstone record 502, in at least one embodiment, comprises a commit state field 508. The tombstone record 502 may be stored as uncommitted during a prepare phase, and then committed once all involved storage nodes have prepared their respective tombstones. The commit state field 508 may indicate whether or not the tombstone has been committed.

Figure 6:
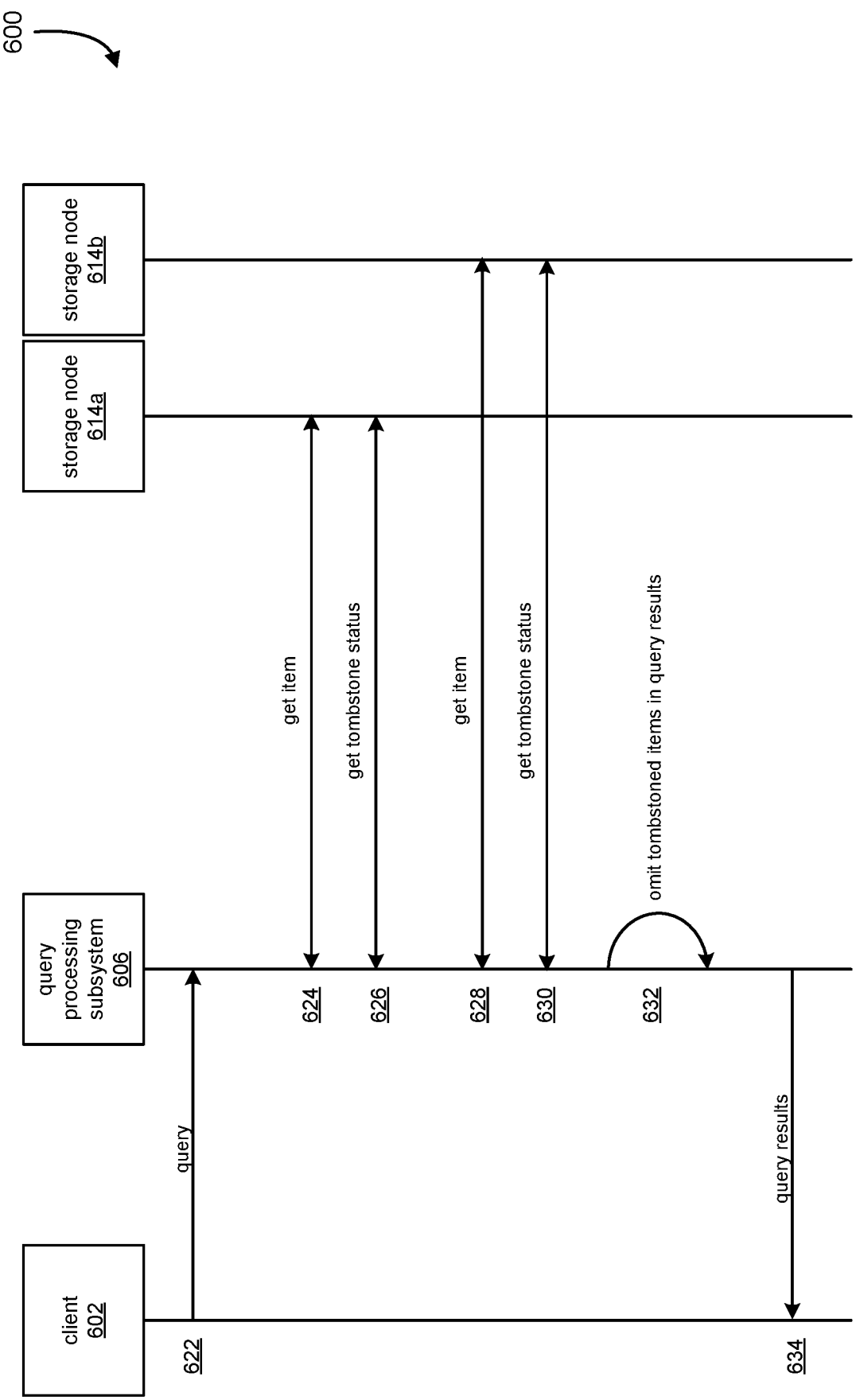
FIG. 6 illustrates an example of a distributed database system responding to a query comprising a reference to a deleted item, in accordance with at least one embodiment.

FIG. 6 illustrates an example of a distributed database system responding to a query comprising a reference to a deleted item, in accordance with at least one embodiment. In particular, FIG. 6 illustrates an example of interactions between components of a distributed database system, such as the distributed database systems depicted in FIGS. 1 and 2. These components may include a client 602, a query processing subsystem 606, and storage nodes 614*a,b* of a storage subsystem.

At 622, a client 602 sends a query to the distributed database, where it is then received by the query processing subsystem 606. The query may be, for example, a query of rows of a logical table, where the rows correspond to one or more items stored on the storage nodes 614*a,b*. In at least one embodiment, the query is a request to directly access items stored on the storage nodes 614*a,b*. Note that the example 600 of FIG. 6 pertains to a query that involves two items, each residing on a separate one of the storage nodes 614*a,b*. However, similar or identical techniques may be applied to retrieve any number of items, from any number of storage nodes.

In at least one embodiment, at 624, the query processing subsystem 606 executes a request to get an item from a first storage node 614*a*. In some cases and embodiments, more than one item may be requested. The storage node 614*a* responds to the request by attempting to locate the requested item. If the item has already been actually deleted, the storage node 614*a* can so indicate, e.g. by sending an error message, providing an empty record, or by other means.

In at least one embodiment, at 626, the query processing subsystem 606 executes a request to get a tombstone status for the item, or items, requested at 624. In at least one embodiment, this request occurs in parallel with the request to get the item(s) at 624.

In at least one embodiment, the storage node 614*a* responds to the request to check tombstone status, as made at 626, by attempting to locate the requested item(s) is indicated in a currently active tombstone record. An item may be indicated when it is included in a range covered by an active tombstone. A tombstone may be considered active when it has been committed, and while its cleanup process has not completed. The tombstone status may also reflect a comparison between a timestamp for the tombstone and a time of insertion for the item. If an item was inserted after the timestamp, it should not be considered deleted even if it falls within a range covered by a tomb stone.

At 628 and 630, similar operations may be performed for a second item, or items, stored on a second storage node 614*b*.

At 632, in at least one embodiment, the query processing subsystem 606 generates results for the query in which any tombstoned items are omitted from the results. Alternatively, the query processing subsystem 606 may indicate that the query failed, due to a requested item not being found. In at least one embodiment, the query processing subsystem 606 checks the tombstone status, as returned by the storage nodes 614*a,b*, and determines based on the status whether or not a returned item should be included in the results. The query processing subsystem 606 will, in at least one embodiment, omit any items indicated by a respective storage node as being tombstoned.

At 634, in at least one embodiment, the results of the query are returned from the query processing subsystem 606 to the client 602.

Figure 7:
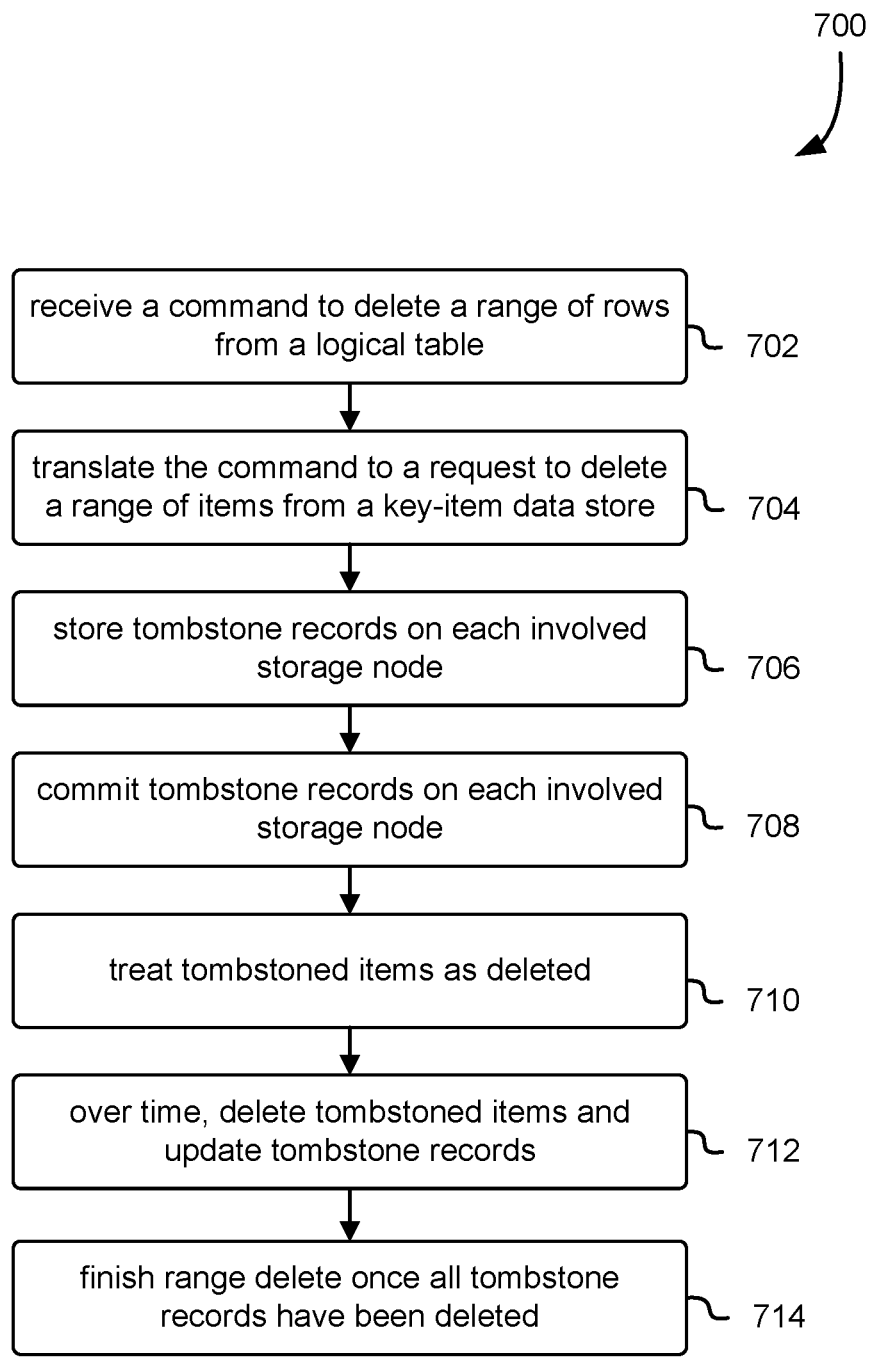
FIG. 7 illustrates an example process for performing a range delete, in accordance with at least one embodiment.

FIG. 7 illustrates an example process 700 for performing a range delete, in accordance with at least one embodiment. Although FIG. 7 is depicted as a series of steps or operations, the depicted sequence should not be viewed as limiting the scope of the present disclosure to only those embodiments that conform to the depicted sequence. For example, in various embodiments, the steps or operations depicted in the figure may be altered, reordered, or omitted, except where explicitly stated or where logically required, such as when an input to one step or operation is obtained from an output of another step or operation.

Figure 9:
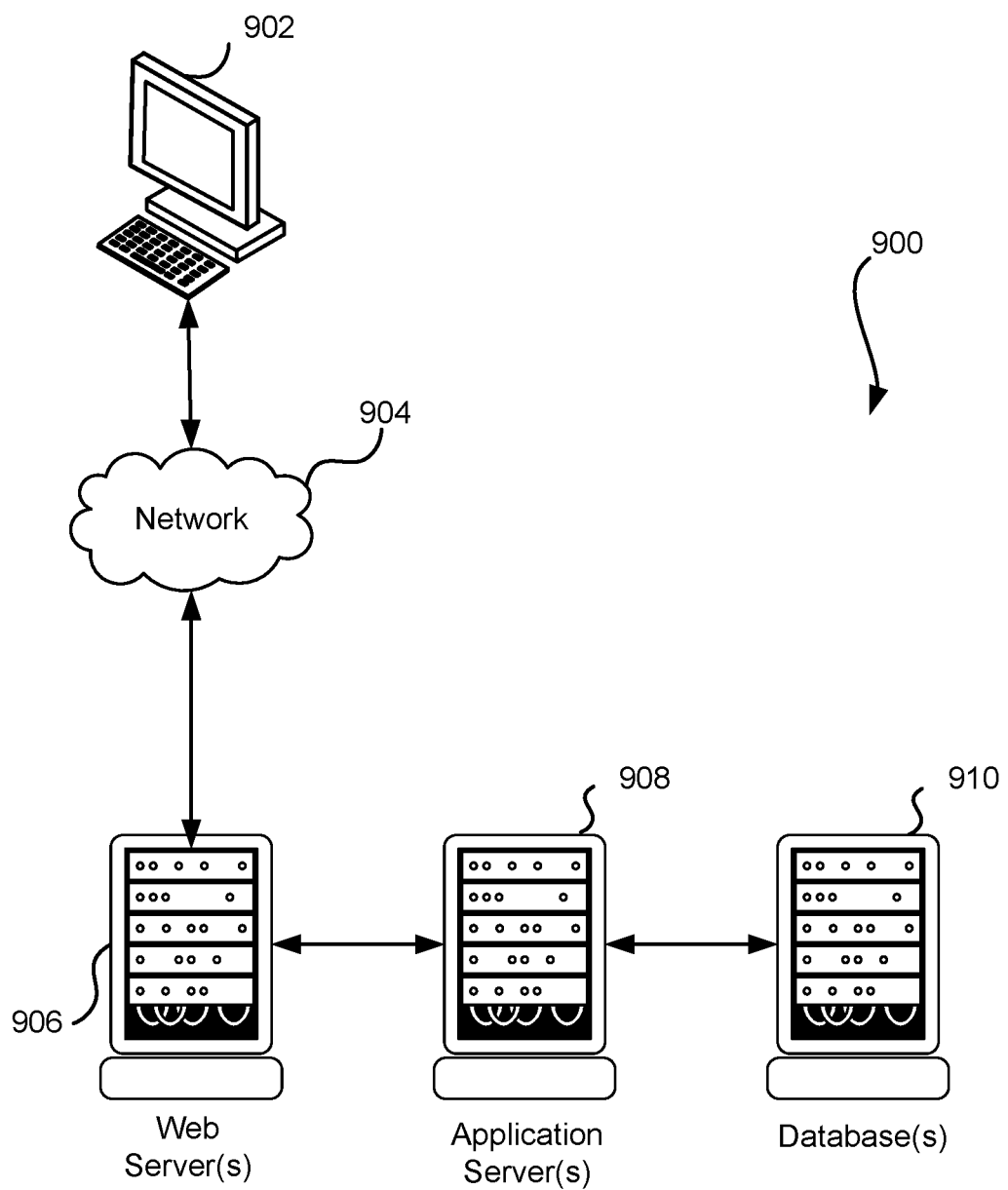
FIG. 9 illustrates an example of a system in which various embodiments can be implemented.

The steps or operations depicted in FIG. 7 may be performed by any of a variety of components or modules, individually or in combination, of the components depicted, for example, in FIGS. 1, 2, and 9. In at least one embodiment, the steps or operations depicted in the figure are performed by a distributed database. In particular, in at least one embodiment, the steps or operations are performed by a query processing subsystem, such as the query processing subsystem depicted in FIGS. 1 and 2.

At 702, the distributed database receives a command to delete a range of rows from a logical table.

In at least one embodiment, the command is sent from a client device to a distributed database management system.

In at least one embodiment, the command is an SQL or CQL command, and specifies the name of a table from which rows are to be deleted, and criteria indicating how those rows should be identified.

At 704, the distributed database translates the command to a request to delete a range of items from a key-item data store. This may comprise analyzing the command and determining how the logical rows indicated by the query map to items stored in a collection of key-item pairs.

In at least one embodiment, the translated command is then processed by components of the distributed database management system, such as is depicted in FIG. 3.

At 706, the distributed database stores tombstone records to be stored on each involved storage node. In at least one embodiment, a transaction coordinator instructs each node to prepare a tombstone record for an indicated range of records. In response, each involved node may confirm that the deletion is valid and stores an uncommitted tombstone record. The nodes may then each indicate that they have successfully prepared the tombstone.

At 708, the distributed database commits the tombstone records on each involved storage node. This is done once the system has confirmed that each of the involved storage nodes have successfully prepared their respective tombstone records.

At 710, the distributed database treats tombstoned items as deleted. In at least one embodiment, an item is treated as deleted once the tombstone on its node has been committed, effective as of a commit time for the delete transaction.

At 712, the distributed database, over time, deletes tombstoned items and updates the tombstone records.

In at least one embodiment, deletion of a tombstoned item comprises deallocating storage space used for the item.

In at least one embodiment, deletion of a tombstone item comprises making the item's data inaccessible by a storage node's processing of get commands or other queries.

In at least one embodiment, updating the tombstone record comprises adjusting range indicators to exclude those items that have already been deleted.

When all of the tombstoned items in a particular tombstone record have been deleted, the distributed database may delete the tombstone record, or otherwise perform an operation to indicate that the tombstone is no longer active and does not need to be examined, whether for the purpose of determining tombstone status or for locating tombstoned items to delete.

At 714, the distributed database finishes the range delete operation once all of the tombstone records have been deleted or otherwise deactivated. This might occur simply by virtue of each tombstone relevant to the particular range delete having been deleted. However, in at least one embodiment, a record of the completion of the cleanup phase is recorded. For example, as depicted in FIG. 3, a transaction coordinator might record, in a journal, and indication that the cleanup phase of the range delete operation successfully completed.

Figure 8:
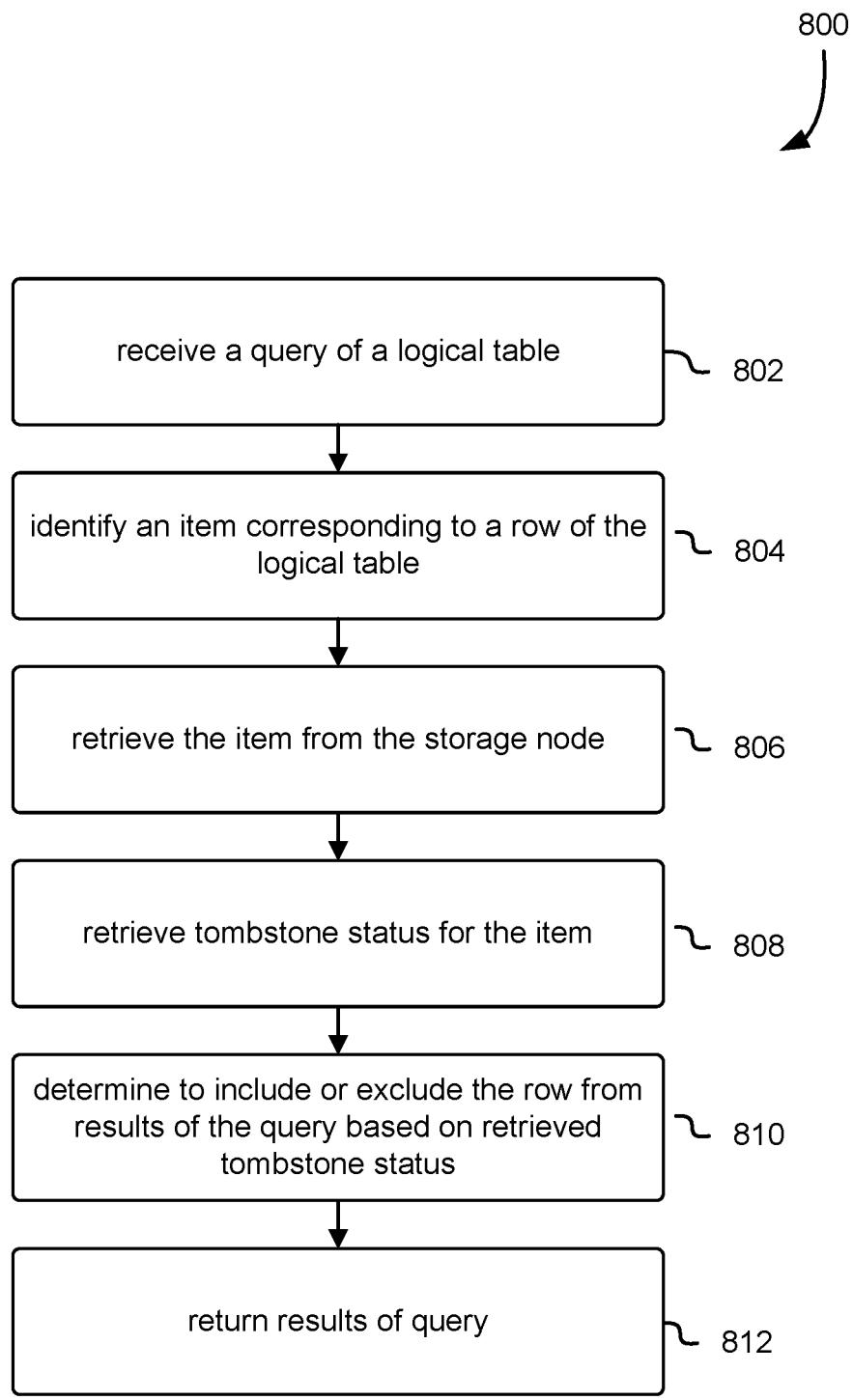
FIG. 8 illustrates an example process of processing a query of a logical table subsequent to a range delete, in accordance with at least one embodiment.

FIG. 8 illustrates an example process 800 of processing a query of a logical table subsequent to a range delete, in accordance with at least one embodiment. Although FIG. 8 is depicted as a series of steps or operations, the depicted sequence should not be viewed as limiting the scope of the present disclosure to only those embodiments that conform to the depicted sequence. For example, in various embodiments, the steps or operations depicted in the figure may be altered, reordered, or omitted, except where explicitly stated or where logically required, such as when an input to one step or operation is obtained from an output of another step or operation.

The steps or operations depicted in FIG. 8 may be performed by any of a variety of components or modules, individually or in combination, of the components depicted, for example, in FIGS. 1, 2, and 9. In at least one embodiment, the steps or operations depicted in the figure are performed by a distributed database. In particular, in at least one embodiment, the steps or operations are performed by a query processing subsystem, such as the query processing subsystem depicted in FIGS. 1 and 2.

At 802, the distributed database receives a query of a logical table. In at least one embodiment, the query is a SQL or CQL query which includes indications of which rows of a logical table are to be returned.

At 804, the distributed database identifies an item that corresponds to a row of the logical table. For example, a query might indicate the retrieval of certain rows of a logical table, and these might be mapped to corresponding items in a collection of key-item pairs.

At 806, the distributed database attempts to retrieve the item from a storage node. For example, the query might be translated to one or more requests to get a particular item, or to one or more requests to retrieve a range of items.

In at least one embodiment, the distributed database system attempts to retrieve the item from a storage node irrespective of whether or not the item is currently tombstoned, but performs step or operation 808, to determine tombstone status, in parallel. If tombstoned, the item can then be omitted from the query results.

In some cases and embodiments, an item which was previously tombstoned may have been already deleted, in which case the storage node would not return it.

In some cases and embodiments, the insertion time of a retrieved item is compared to the timestamp of a tombstone. An item which was inserted prior to the timestamp can be considered deleted, whereas an item which was inserted after the timestamp could be considered to not be deleted, even if it falls within the range indicated by a tombstone.

At 808, the distributed database retrieves tombstone status for the item. For example, a request for tombstone status may be sent to the storage node on which an item is stored. The storage node may then respond by searching for a tombstone that whose range encompasses the item and whose timestamp is later than the item's time of insertion. The storage node can then indicate whether or not the item is tombstoned.

At 810, the distributed database determines to include or exclude the row from the results of the query, based on the retrieved tombstone status. In at least one embodiment, a row indicated as tombstoned is omitted from the results of the query. In other instances, if the row is not indicated as tombstoned, and is successfully retrieved, then it can be included in the results of the query.

At 812, the distributed database returns results of the query. For example, the distributed database may assemble obtained items into a result set corresponding to the rows and projection indicated by the query, while omitting any rows that corresponded to tombstoned items.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a database 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The database 910, in an embodiment, includes several separate data tables, databases, data documents, dynamic data storage schemes and/or other data storage mechanisms and media for storing data relating to a particular aspect of the present disclosure. The database 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions.

In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   at least one processor; and
   a memory comprising executable instructions that, in response to execution by the at least one processor, cause the system to at least:
      receive a request to delete a plurality of rows from a logical table, wherein data for the logical table comprises a collection of items stored on a plurality of storage nodes;
      cause at least a first storage node of the plurality of storage nodes to store a tombstone record indicative of a range of items to delete from the collection of items, the range of items corresponding to the plurality of rows to be deleted from the logical table;
      receive a query of the logical table;
      determine that an item indicated by the query is stored on the first storage node; and
      exclude the item from results of the query, based at least in part on a determination, by the first storage node, that the item is included in the range of items to delete from the collection of items.

2. The system of claim 1, wherein the tombstone record is initially stored in an uncommitted state.

3. The system of claim 2, wherein the tombstone record is committed based at least in part on one or more additional storage nodes successfully storing one or more additional tombstone records indicative of the range of items to delete from the collection of items.

4. The system of claim 1, wherein the executable instructions, in response to execution by the at least one processor, cause the system to at least:
   identify one or more undeleted items in the range of items to delete from the collection of items;
   cause the one or more items to be deleted from the first storage node; and
   update the tombstone record to indicate that the one or more items have been deleted.

5. The system of claim 1, wherein the executable instructions, in response to execution by the at least one processor, cause the system to at least:
   store a timestamp with the tombstone record, the timestamp indicative of a time at which the rows of the logical table were deleted; and
   determine that an additional item in the range of items should not be treated as deleted, based at least in part on comparing the timestamp to a time the additional item was inserted into the collection of items.

6. A computer-implemented method, comprising:
   processing a request indicative of deleting a plurality of items from a collection of items stored on a plurality of storage nodes;
   causing at least a first storage node of the plurality of storage nodes to store a record indicative of a range of items to be deleted, wherein the record is initially stored in an uncommitted state, wherein items are treated as deleted when at least two storage nodes of the plurality of nodes have stored the record;
   processing a query of an item stored on the first storage node;
   determining to exclude the item from results of the query, based at least in part on the item being included in the range of items to delete from the collection of items; and
   sending the results of the query.

7. The computer-implemented method of claim 6, further comprising:
   storing the record in the uncommitted state; and
   committing the record based at least in part on one or more additional storage nodes successfully storing one or more additional records indicative of the range of items to delete from the collection of items.

8. The computer-implemented method of claim 7, wherein an item is not treated as deleted when the record is in an uncommitted state.

9. The computer-implemented method of claim 6, further comprising:
determining to delete one or more items from the first storage node, based at least in part on the record indicative of the range of items to be deleted.

10. The computer-implemented method of claim 6, further comprising:
deleting one or more items from the first storage node, the one or more items within the range of items to be deleted from the collection of items; and
updating the record to indicate that the one or more items have been deleted.

11. The computer-implemented method of claim 10, further comprising:
determining that all items within the range of items, inserted prior to a time of deletion, have been deleted from the first storage node; and
deleting the record from the first storage node.

12. The computer-implemented method of claim 6, further comprising:
storing a timestamp indicative of a time associated with the request indicative of deleting the plurality of items; and
determining that an additional item in the range of items should not be treated as deleted, based at least in part on comparing the timestamp to a time the additional item was inserted into the collection of items.

13. The computer-implemented method of claim 6, further comprising:
identifying, at a second storage node, one or more undeleted items in the range of items to delete from the collection of items; and
causing the one or more undeleted items to be deleted from the second storage node.

14. A non-transitory computer-readable storage medium having stored thereon executable instructions that, in response to being executed by one or more processors of a computing device, cause the computing device to at least:
receive a request to delete a plurality of rows of a logical table, wherein data for the logical table is stored as a collection of items on a plurality of storage nodes;
cause at least a first storage node of the plurality of storage nodes to store a record indicative of a range of items to be deleted, the range of items corresponding to the plurality of rows;
receive a query of the logical table;
determine to exclude an item from results of the query, based at least in part on the first storage node indicating that the item is included in the range of items to delete from the collection of items; and
send the results of the query.

15. The non-transitory computer-readable storage medium of claim 14, wherein the item is treated as deleted when each of two or more storage nodes, of the plurality of storage nodes, have recorded a record indicative of the range of items to be deleted.

16. The non-transitory computer-readable storage medium of claim 14, wherein the record is stored on the first storage node in an uncommitted state, and committed based at least in part on one or more additional storage nodes successfully storing one or more additional records indicative of the range of items to delete from the collection of items.

17. The non-transitory computer-readable storage medium of claim 14, wherein the first storage node determines that one or more items are included in the range of items to be deleted.

18. The non-transitory computer-readable storage medium of claim 17, having stored thereon further executable instructions that, in response to being executed by one or more processors, cause the computing device to at least:
cause the one or more items to be deleted from the first storage node in response to the determination that the one or more items are included in the range of items to be deleted.

19. The non-transitory computer-readable storage medium of claim 18, having stored thereon further executable instructions that, in response to being executed by one or more processors, cause the computing device to at least:
cause the record to be updated to indicate that the one or more items have been deleted.

20. The non-transitory computer-readable storage medium of claim 18, having stored thereon further executable instructions that, in response to being executed by one or more processors, cause the computing device to at least:
determine that an additional item in the range of items should not be treated as deleted, based at least in part on comparing a timestamp of the record to a time the additional item was inserted into the collection of items.

* * * * *